United States Patent [19]

McKinney et al.

[11] 4,138,050
[45] Feb. 6, 1979

[54] WIENER STICK APPLICATOR

[76] Inventors: David E. McKinney, Rte. 2, Box 43A 1; Donald E. Phillips, Rte. 2, Box 129A, both of Daingerfield, Tex. 75638

[21] Appl. No.: 851,828

[22] Filed: Nov. 16, 1977

[51] Int. Cl.² ............................................. B27F 7/00
[52] U.S. Cl. .................................. 227/117; 227/100; 227/120
[58] Field of Search ...................... 227/2, 76, 100, 117, 227/120, 131, 139, 141

[56] References Cited

U.S. PATENT DOCUMENTS

| | | | |
|---|---|---|---|
| 3,580,456 | 5/1971 | Zueger et al. | 227/100 |
| 3,691,608 | 9/1972 | Lowrance | 227/139 |
| 4,069,960 | 1/1978 | Lowrance | 227/139 X |

*Primary Examiner*—Howard N. Goldberg
*Assistant Examiner*—Paul A. Bell
*Attorney, Agent, or Firm*—Joseph H. Schley; Thomas L. Cantrell

[57] ABSTRACT

A wiener stick applicator composed of a drum or magazine rotatable about its horizontal longitudinal axis and having parallel grooves extending longitudinally of its exterior for supporting handle sticks and wieners or wieners/half wieners, in axial aligned relationship, fed to the grooves from chute or hopper means. One end portion or generally one-half of each groove is relatively narrow for snugly receiving one of the sticks, while the remainder of each groove is relatively wide and generally equal to the diameter of the wieners. A coaxial casing circumscribes the drum in spaced relationship and coacts with the grooves to confine the sticks and wieners against displacement. The casing has an inlet opening extending longitudinally of the drum for admitting an axially aligned stick and wiener to each groove. A outlet opening, extending longitudinally of the drum, is provided in the casing in spaced relation to the inlet opening for the ejection of wieners impaled on sticks. A stick pusher is provided for each groove and has a spline slidably mounted in the outer end portion of the narrow half of said groove for engaging and forcing each stick to penetrate the wiener aligned therewith upon reciprocation of the pusher toward said stick while revolving with the drum between the inlet and outlet openings. Each pusher has a cam follower for coacting with a generally V-shaped cam slot in the casing to reciprocate the pusher toward and away from its respective stick.

10 Claims, 8 Drawing Figures

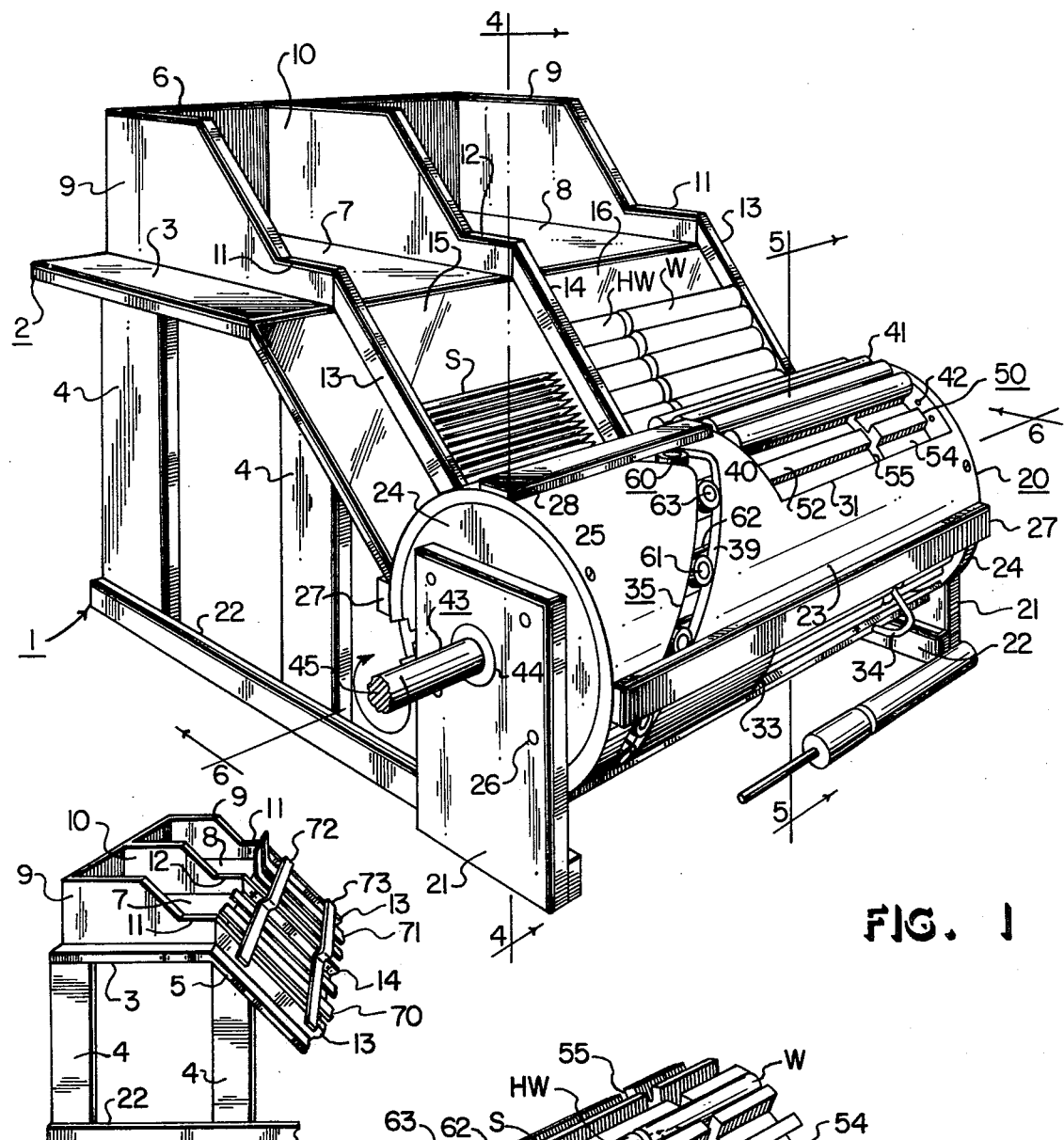
FIG. 1
FIG. 8
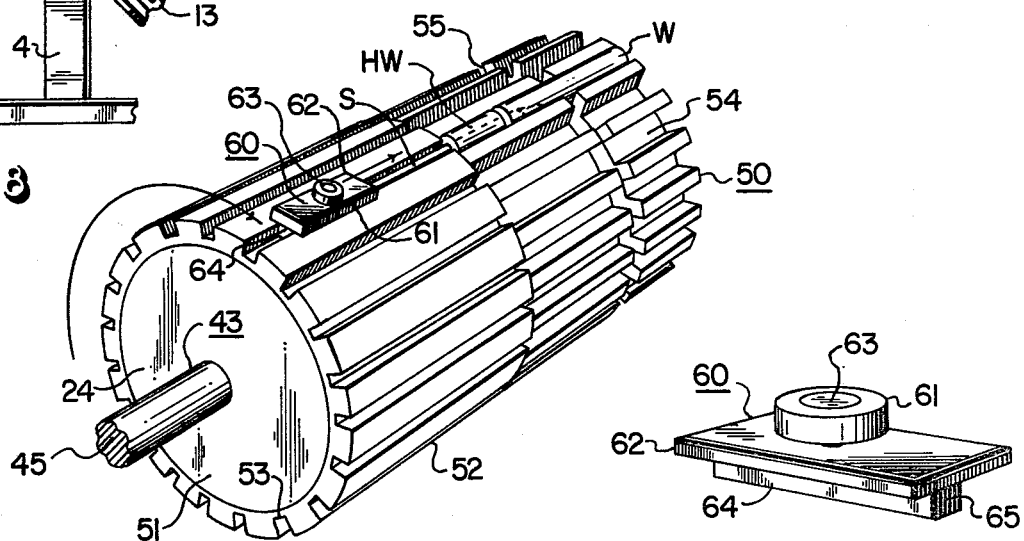
FIG. 2
FIG. 7

WIENER STICK APPLICATOR

BACKGROUND OF THE INVENTION

Heretofore, many attempts have been made to inexpensively and automatically or semiautomatically insert elongated or handle sticks axially into wieners and other food products. This operation becomes complicated when the food product is elongated, such as the so-called "foot long hot dog," by impaling a wiener and a half wiener on a single handle stick. Obviously, it is necessary to confine both the wieners and the sticks against lateral displacement during the penetration of said wieners by said sticks. For economy as well as efficiency, the operation should be continual if not continuous and should require minimum manual handling of the wieners and/or sticks. In addition to impaling the wieners on the sticks, it is necessary to feed said wieners and sticks from bins or hoppers into axial alignment with one another as well as with suitable actuating mechanism for forcing each stick toward the wiener or wiener/half wiener into impalement relationship and then discharge the combined stick/wiener for convenient subsequent handling. The prior art shows horizontal and vertical reciprocable plungers or pushers, some of which are manually operated and several of which are cam operated. Food products are positioned in axial alignment, singly or in multiples, with the sticks by horizontal conveyors, hand, gravity and rotary hoppers and slides, while said sticks are so positioned by gravity from vertical and horizontal hoppers through chutes, rotary magazines and manually.

Insofar as known previously, handle sticks and wieners have not been axially aligned and maintained in such relationship during penetration of said wieners by said sticks by means of a rotary magazine or drum having coaxial longitudinal grooves or recesses for receiving and supporting said sticks and wieners while revolving between an inlet and an outlet.

Examples of the closest known prior art located in a search of the prior U.S.A. patents in the Patent and Trademark Office are as follows:

Sattler U.S. Pat. No. 2,152,214 discloses a vertical reciprocable plunger for ejecting sticks downwardly from a vertical rotary magazine so as to penetrate ice cream blocks cut from an underlying moving column.

Pikal U.S. Pat. No. 2,733,439 shows a horizontal stick hopper, a feed mechanism and a stick driving mechanism having a vertical reciprocable hammer for embedding a stick in an apple conveyed therebelow.

Smith U.S. Pat. No. 2,740,117 has a horizontal stick hopper and a horizontal reciprocable plunger for inserting a handle stick into a stationary impalable article.

Raimondi U.S. Pat. No 2,799,857 discloses a horizontal reciprocable ram and pusher pin for inserting a stick into a stationary apple fed by a chute from a horizontal stick hopper.

Blake U.S. Pat. No. 3,213,486 shows mold means to form food products and stick driver means having a horizontal ram and a plunger for pushing sticks from a trough into the food product.

Walters U.S. Pat. No. 3,353,735 discloses an upright reciprocable carriage plate slidably mounted on upright posts and has a horizontal pusher bar for driving stick placed in the notches of a pair of spaced guides into an apple upon rotation of a crank arm and a cam follower by a motor shaft relative to the cam slot of a cam plate mounted on reciprocable carriage plate.

Earling et al. U.S. Pat. No. 3,431,695 has separate slides to synchronously feed a lid and a spoon to an assembly head which positions the spoon handle in perpendicular relationship with underside of lid, a reciprocable plunger for driving said spoon handle upwardly through said lid by oscillation of a plunger pivot arm about its pivot. A cam follower and a rotary cam coact to rock the cam follower about its pivot to reciprocate an upright rod downwardly to acuate a cup assembly head and thereby press the cap/lid spoon on a cup.

Zueger U.S. Pat. No. 3,580,456 discloses an inclined bowl having a rotary bottom plate or feeder wheel with peripheral openings for positioning articles to be impaled by sticks in a hopper fed by peripheral grooves in an upright rotary drum to a slot and pushed through another slot into the article.

Lowrance U.S. Pat. No. 3,691,608 has a food holder for a horizontal row of wieners during inserting axially aligned sticks, a hopper for supplying and aligning the sticks and a reciprocable carriage including plungers for feeding and inserting said sticks into chambers of holder.

SUMMARY OF THE INVENTION

This invention relates to the automatic or semiautomatic insertion of a cylindrical handle stick axially into a wiener or wiener and half wiener or other elongated edible article in an inexpensive relatively uncomplicated manner wherein the sticks and wieners are axially aligned and confined against lateral displacement during the axial penetration of each wiener by a stick and while conveying said stick and wiener between feeding and discharging means. Preferably, the handle sticks and wieners/half wieners are positioned in parallel end-to-end relationship within separate side-by-side chutes or hoppers and fed by gravity to one side of a drum or magazine rotatable about its horizontal longitudinal axis, which is parallel to said aligned sticks and wiener/half wieners, and having a multiplicity of parallel longitudinal generally coextensive grooves in its cylindrical exterior. A complementary casing overlies at least a portion of the drum or magazine and coacts therewith to confine the sticks and wiener/half wieners against lateral displacement relative to said drum or magazine.

One end portion or generally one half of each groove is relatively narrow for snug engagement by one of the sticks, while the remainder or other half of said groove is relatively wide so as to accommodate one of the wieners/half wieners. An elongate inlet or feed opening in the casing extends longitudinally of the drum (parallel to its axis) adjacent the lower ends of the chutes or hoppers and is of sufficient length to permit axially aligned sticks and wieners/half wieners to drop consecutively into the grooves of said drum. The casing has an elongate outlet or discharge opening in parallel spaced relation to its inlet opening to permit ejection of wieners/half wieners impaled on sticks. Suitable hooklike ejecting means projects inwardly from the casing discharge opening toward the drum for contact by the impaled wieners/half wieners upon rotation of said drum.

A stick pusher is provided for each groove of the drum and is composed of a flat body or plate having an elongate key projecting from its inner side for slidable confinement in the outer end portion of the narrow half of the groove. The key is adapted to engage and force the stick in each groove to penetrate axially the wiener/half wiener in the wide half of said groove upon reciprocation of the pusher toward said stick while revolving with the exterior of the drum between inlet and discharge openings during rotation of said drum. Each pusher has a cam follower or wheel for coacting with a generally V-shaped cam slot in the portion of the casing overlying the narrow halves of the drum grooves so as to reciprocate the pusher toward and away from the stick in its respective groove. Except for the continuity of this reciprocal movement, the casing need not form a complete cylinder and could be arcuate or semicircular.

In order to accommodate the relatively large diameter of the wieners/half wieners, the interior of the casing and the bottoms of the relatively wide end or wiener/half wiener portions of the drum grooves are spaced apart a greater distance than said casing interior and the bottoms of the relatively narrow end or stick portions of said grooves. This spacing permits the provision of elongate parallel longitudinal rollers for rotatable confining engagement with the wieners/half wieners during insertion therein of the sticks upon rotation of the drum. As a result, each of the rollers rotates about its respective axis and permits the wieners/half wieners to remain stationary except for revolving with the drum exterior during the aforesaid impalement. Dur to their relatively small diameter, it is unnecessary to provide similar antirotational means for the sticks.

Insofar as this invention is concerned, the words "wiener" and "wiener/half wiener" are interchangeable either when singular or plural; however, the latter are more difficult to axially penetrate whereby the necessity of the novel applicator is more pronounced. Although adapted to be constructed primarily of wood, the applicator may be formed of metal as illustrated.

BRIEF DESCRIPTION OF THE DRAWINGS

FIG. 1 is a perspective view of an apparatus for inserting sticks into wieners, constructed in accordance with the invention but omitting the chute guards, as well as one of the impaled wieners, FIG. 2 is a perspective view of the rotatable drum or magazine removed from the cylindrical casing of the apparatus to show the several longitudinal grooves thereof and one each of the stick pushing elements and wieners, FIG. 7 is an enlarged perspective view of one of said stick pushing elements, and FIG. 8 is a reduced perspective view of a portion of said apparatus illustrating chute guards for the sticks and wieners.

DESCRIPTION OF A PREFERRED EMBODIMENT

Figure 3:
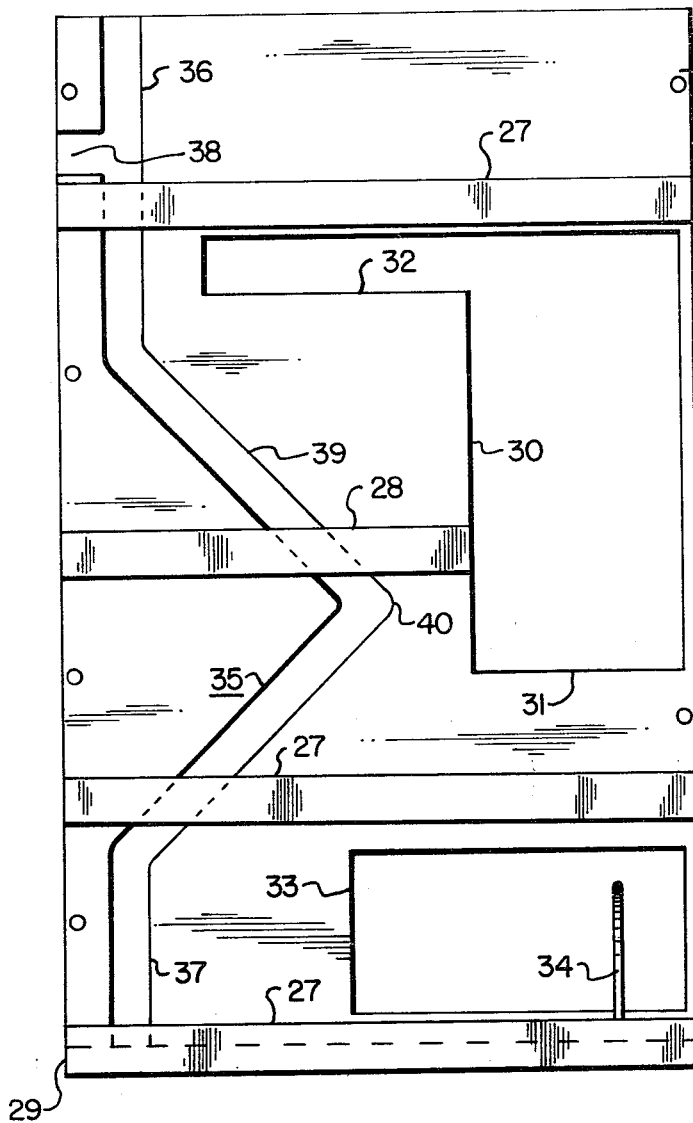
FIG. 3 is a layout plan view of said cylindrical casing which circumscribes and covers said drum.

In the drawings, the numeral 1 generally designates an apparatus or machine, for axially inserting sticks into wieners or other elongated edible articles embodying the principles of the invention and having a rear table portion 2 composed of a horizontal flat rectangular top or upper surface 3 supported by upright legs 4. An inclined coextensive flat plate or chute or hopper member 5 depends from the front longitudinal margin of the table top 3 which has an upright plate or wall 6 upstanding from its rear longitudinal margin and terminating short of its transverse margins. Open bins 7, 8 are formed by a pair of upright end plates or walls 9 and an upright center plate or wall 10 extending transversely of the flat table top from the ends and middle portion, respectively, of its rear wall 6 to its front margin. If desired, the front upper end portions 11, 12 of the upright transverse bin walls 9, 10 may be deeply recessed or cut away to facilitate access to bins 7, 8. A pair of upright end rails 13 and an upright center rail 14, of the same height as front end portions 11, 12 of the transverse bin walls, extend therefrom transversely of the inclined flat plate or chute member 5 to the front margin thereof to provide chutes or hopper 15, 16 of the same widths as bins 7, 8, respectively, for sticks S and wieners W which are adapted to be stored (not shown) in said bins. If desired, the horizontal bottoms of the bins, which are provided by the table top 5, could be inclined in the same manner as chutes or hoppers 15, 16 so as to form continuations thereof. Preferably, the widths of the respective bins and chutes are only slightly greater than the respective lengths of the sticks and wieners so as to maintain said sticks and wieners in the desired transverse aligned relationship.

Although the apparatus of this invention is designed to handle wieners W and axially aligned half wieners HW for axial penetration by sticks S, which is difficult, it is readily apparent that the width of bin 8 and guide chute or hopper 16 may be reduced to approximately the length of only said wieners W, either during construction or by blocking one or both sides of said bin and guide chute or hopper. Obviously, the sticks for single wieners might be of shorter length and bin 7 and guide chute 15 of less width.

Figure 4:
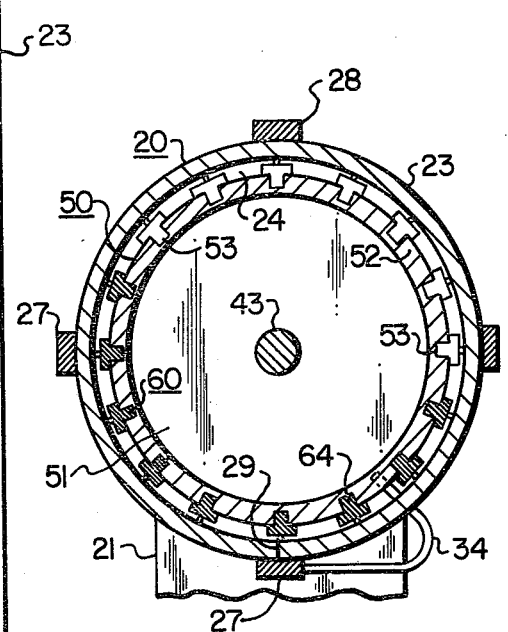
FIG. 4 is a transverse vertical sectional view taken on the line 4—4 of FIG. 1 to show the relationship between said stick pushing elements and the stick grooves of said drum.

A cylindrical hollow casing or cover 20, which may be of a length slightly greater than the width of table top 3 as shown, extends transversely of the front margin of said top and is supported by and between a pair of relatively short and broad, upright legs 21 which are adapted to be connected to table legs 4 by a pair of horizontal beams 22 (FIGS. 1, 8) fastened to the bases of said legs. As best shown in FIG. 3, casing 20 is composed of a flat plate or sheet 23 of suitable metal or other material capable of being rolled or formed into annular or circular configuration (FIGS. 4, 5, 6) and having its ends encircling and detachably connected to the peripheries of a pair of circular plates or disks 24 by suitable fasteners, such as screws 25. Circular end plates 24 are secured to the upper portions of legs 21, as shown at 26 in FIG. 1, in upright parallel abutment with the inner surfaces of said legs.

A multiplicity of, such as four, exterior elongate reinforcing bars or cleat members 27 and a similar bar 28, of less length, are secured to and extend longitudinally of the cylindrical casing in parallel spaced relationship and in right angular relation to circular end plates 24. Elongate longitudinal bars or cleat members 27 are coextensive with and are disposed transversely of sheet 23 of casing 20 and, as shown at 29 in FIG. 3, one of said bars has its outer longitudinal half projecting beyond one of the transverse end margins of said sheet so as to overlap the other end of said sheet (FIGS. 4, 5) for fastening thereto upon the rolling thereof into cylindrical form. The inner end of shorter bar or cleat member 28 terminates at the transverse medial portion of the casing sheet, extending from the left toward the right margin of said sheet a short distance past the transverse center of said sheet as shown at 30 in FIGS. 3, 4.

A generally rectangular opening 31, elongated and extending circumferentially of casing sheet 23 adjacent its right margin, has an elongate narrow extension or slot 32 projecting transversely leftward from its right counterclockwise end portion (FIG. 5) to provide an inlet or feed opening for the sticks S, wieners W and half wieners HW. The numeral 30 also designates the left circumferential or longitudinal margin of rectangular opening 31. The casing sheet has a rectangular discharge or outlet opening 33, adjacent its right margin and its clockwise end, in close proximity to the lowermost reinforcing bar 27 having the outwardly projecting longitudinal half 29 and in remotely spaced parallel relation to the inlet opening. A curved ejection element or hook 34 projects transversely outward and forward from the right end portion of the latter aforesaid bar 27 and is bent upwardly and rearwardly (FIGS. 4, 5) through discharge opening 33 in spaced relation to its right end. The discharge opening is elongated transversely of casing sheet 23 so as to have its greater length extending longitudinally of casing.

A circumferential elongate cam opening or slot 35 extends longitudinally of casing sheet 23 (FIG. 3) adjacent its left margin and has a pair of aligned end portions 36, 37 disposed in parallel relation to said sheet margin and adapted to register when said sheet is formed into a cylinder around end plates 24. Clockwise or left end portion 36 is of much greater length than the counterclockwise or right end portion 37 of the slot and has a short transverse cam entry opening or slot 38 extending from its left margin to the adjacent left margin of the casing sheet. An intermediate wide or spread V-shaped (right angled) portion 39 of cam slot 35 connects the perpendicular end portions thereof and has its arms or legs converging rightwardly at an inner center point 40 in the medial portion of casing sheet 23—adjacent inlet opening 31 and inner end of short reinforcing bar 28, FIG. 3—so as to complete the continuity of said cam slot. As shown in FIG. 1, the bar 28 and inner center point 40 of the cam slot are at the top of casing 20 when it is secured around circular end plates 24. The major portion of inlet opening 31 is closed by a plurality of elongate parallel equally and closely spaced cylindrical rollers 41 which extend transversely across said opening and longitudinally of the casing. As shown generally at 42 in FIGS. 1, 6, each cylindrical roller 41 has its axial end pin confined in complementary openings in the opposed side walls of the inlet opening. The lower counterclockwise end portion (FIG. 5) of inlet opening 31 is unobstructed so as to permit the entry or feeding of the wieners and sticks therethrough.

As axial shaft 43 extends through circular end plates 24 of casing 20 and the upper portions of legs 21 and is rotatably mounted or journaled by suitable bearings 44 in said leg upper portions. The shaft 43 has a leftwardly projecting end portion 45 for connection with a hand crank (not shown) or other rotation imparting means. As shown at 46 in FIG. 6, the end plates of the cylindrical casing have coaxial openings of greater diameter than the axial shaft so as to facilitate relative rotation of said shaft. A cylindrical coaxial drum or magazine 50 is mounted in casing 20 on shaft 43 for rotation therewith by having its circular end plates or disks 51 concentrically surrounding and fixed to said shaft. Drum 50 includes a cylindrical external member or wall or shell 52 having its ends encompassing and secured to the peripheries of drum end plates 51. A multiplicity of elongate narrow channels or grooves 53 extends longitudinally from the left end to the medial portion of drum shell 52 in parallel equally spaced relationship (FIGS. 2, 4, 6) for separately receiving sticks S from the lower end of chute 15 and slidably confining said sticks in coaction with the cylindrical interior of casing 20 during rotation of the drum. The longitudinal channels 53 project beyond the center of the drum shell and are complementary in width to but of greater length than the sticks, terminating generally at the right margin 30 of inlet opening 31 of the casing when assembled.

Figure 5:
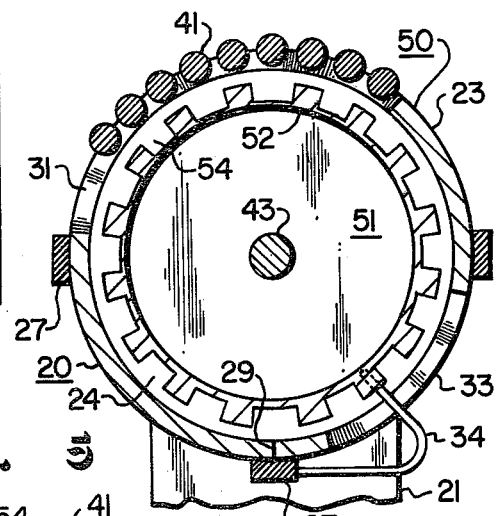
FIG. 5 is a view, similar to FIG. 4 and taken on the line 5—5 of FIG. 1, showing the wiener grooves of said drum, and the wiener holddown, discharge opening and ejector of said cylindrical casing or drum cover.
Figure 6:
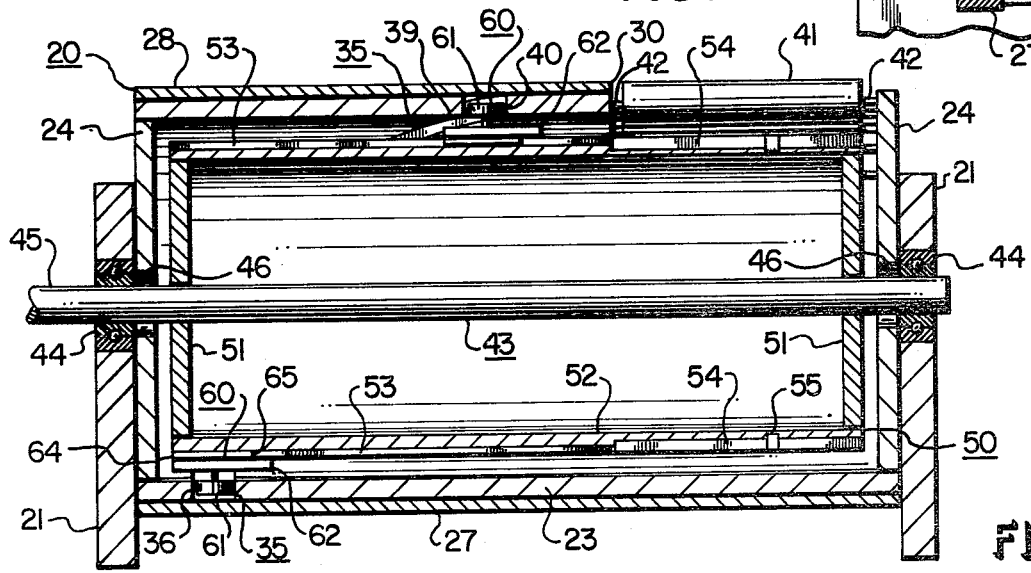
FIG. 6 is a longitudinal vertical sectional view taken on the line 6—6 of FIG. 1 to show the mounting of said drum.

As best shown in FIGS. 2, 5, 6, the right end portion of drum shell 52 is of reduced external diameter and has a multiplicity of elongate grooves or channels 54 in its exterior extending longitudinally thereof in parallel equally spaced relationship for receiving and supporting wieners W/half wieners HW. These grooves are generally of the same length and width as the combined wieners and half wieners and are axially aligned as well as communicate with the stick channels. Since stick channels 53 are of less width than aligned communicating wiener grooves 54, said channels are spaced apart a greater distance than said grooves. A circumferential groove or recess 55 in the exterior of the drum shell bisects the wiener grooves in adjacent spaced relation to the right ends thereof and is adapted to be engaged by the free upper rearward or left end of ejection hook 34 which rides therein so as to be contacted by the wieners upon rotation of drum 50. The length of grooves 54 is generally equal to the width of inlet opening 31 of casing 20 as defined by its left margin 30, and a number of said grooves always register with said opening and its transverse rollers 41 throughout rotation of the drum. The transverse length of discharge opening 33 of the casing is greater than the length of the wiener grooves so as to extend beyond the left or inner ends of said grooves and expose the right or inner ends of channels 53 as well as the outer or left ends of sticks S impaling the wieners.

A stick pushing element or pusher 60 (FIG. 7) is provided for each of the stick channels and has a cam follower or wheel 61 for riding in the cam opening or slot 35 of cylindrical casing 20 as shown in FIGS. 1, 6. Cam wheel 61 of each pusher 60 overlies and is rotatably mounted on a flat rectangular body or plate 62, of greater length than width, by an upstanding arbor or pin 63 and is adapted to follow the configuration of the cam slot upon rotation of drum 50. An elongate center key or spline 64 extends longitudinally of the underside of each pusher body 62 and, as shown at 65 in FIGS. 6, 7, has its inner or right end recessed or offset relative to or terminating short of the inner or right end of said body. The key or spline 64 of each pusher is complementary to and slidably confined in one of the channels 53 and its recessed inner or right end 65 is adapted to abut the outer or left end of one of sticks S for pushing the latter toward the right so as to force each stick to axially penetrate one of the wieners upon rotation of the drum. As best shown in FIG. 2, the bodies of the pushers 60 ride upon the circumferential exterior of drum 50 in underlying relation to the casing. The stick pushers are installed by inserting the keys one at a time into the left or outer ends of the stick channels when each channel registers with cam entry opening or slot 38 which is adapted to receive cam wheels 61. The stick pushers are adapted to be removed in the same manner.

As shown at 70 in FIG. 8, it is desirable to provide suitable guards or guides for inclined stick and wiener chutes 15, 16 to confine single layers of sticks S and wieners/half wieners W/HW in slidable contact with said respective chutes. These guards may be composed of upright parallel spaced bars 70, 71 extending longitudinally of and in parallel spaced relation to the respective stick and wiener chutes. A pair of parallel spaced bars 72 extend transversely of upright bars 70, 71 in overlying relationship for connecting said upright bars to one another. Preferably, left portions 73 of transverse bars 72 are offset downwardly inward into closer proximity to chute 15 due to the smaller diameter of the sticks relative to the wieners. Manifestly, the transverse bars may be fastened to end and center rails 13, 14 of the chutes in any suitable manner, which is not illustrated.

In operation, supplies of sticks S and wieners/half wieners W/HW are placed in bins 7, 8, respectively, with single layers thereof being positioned in respective stick and wiener chutes or hoppers 15, 16. Due to the weight of the overlying members of each layer, the lowermost stick and wiener/half wiener in the chutes are fed consecutively through the lower portion of inlet opening 31 of casing 20 (FIG. 5) into one of the longitudinally aligned channels 53 and grooves 54 of drum 50 upon clockwise rotation of said drum. In addition to confining the wieners/half wieners in the grooves, rollers 41 of the inlet opening rotate about their respective axes relative to the drum and casing during penetration of said wieners by the sticks so as to obviate rotation thereof about their respective separate axes. Aligned end portions 36, 37 of casing cam slot 35 maintain pushers 60 in retracted position at the left end of drum 50 during entry and discharge of sticks S. Key 64 of each pusher contacts the outer or left end of the stick confined in the channel 53 of the drum in which said key is slidably engaged when the cam wheel 61 of the pusher commences to be forced inwardly by wide V-shaped portion 39 of the cam slot.

Upon each cam wheel reaching inner center point 40 of cam slot 35, penetration of the stick is completed and then pusher 60 commences to move outwardly toward the left, away from the impaled stick, due to the angularity of cam slot portion 29 of the casing. It is noted that during this penetration or impalement, the outer or left end of each stick S is confined against upward displacement by the overhanging right or inner end of pusher plate 62 when said stick engages recessed end 65 of pusher key 64. After penetration by a stick, each wiener is free to rotate about its axis while revolving with drum 50 about its shaft 43 between the last clockwise roller 41 of inlet opening 31 and the counterclockwise longitudinal margin of discharge opening 33. At this point, each wiener W strikes the inner rearward or left end of hook 34 and is ejected through the discharge opening by being lifted out of its groove 54. Since the latter opening is of greater length than the wiener and its impaled stick, there is no interference with its ejection. It is noted the ejection hook and its coacting circumferential groove 55 are disposed so as to contact the medial portion of each wiener in spaced relation to its aligned half wiener HW.

What we claim is:

1. An apparatus for inserting relatively slender handle sticks in elongate edible articles, such as axially aligned wieners/half wieners, including
   a drum having a cylindrical exterior and a generally horizontal axis about which it is rotatable,
   upright means for rotatably supporting the drum,
   a multiplicity of parallel spaced grooves extending longitudinally of the cylindrical exterior of said drum,
   one end portion of each groove being relatively narrow to provide a channel for receiving and supporting a relatively slender handle stick,
   the other end portion of each groove being relatively wide to provide an elongate pocket for receiving and supporting an elongated edible article of relatively large diameter in axial alignment with the stick in the channel half of said groove,
   the relatively narrow channel of each drum groove being of greater length than each stick,
   means for simultaneously feeding axially aligned sticks and edible articles consecutively and respectively to said channels and pockets of said grooves upon rotation of said drum,
   coaxial casing means overlying generally the upper one half of said drum in spaced relationship and coacting therewith to prevent displacement of the sticks and edible articles from said grooves,
   the casing means having an inlet opening extending longitudinally thereof in parallel relation to said drum grooves for registering therewith and communicating with the feeding means so as to admit the sticks and edible articles to said grooves,
   said casing means having an outlet opening extending longitudinally thereof in remotely spaced parallel relation to its inlet opening for discharging the edible articles impaled on the sticks,
   pusher means mounted on said casing means in overlying relatively close proximity to each drum channel and having spline means slidably confined in the outer end portion of said channel for reciprocal movement toward and away from the stick therein, and
   cam means extending circumferentially of said casing means in overlying relation to said channel outer end portions and having each pusher means in movable contact therewith for imparting inward and outward reciprocation to said pusher means relative to said channel upon rotation of said drum so as to engage and force the stick to penetrate the edible article in axial alignment therewith and then withdraw said pusher means to said outer end portion of said channel.

2. An apparatus as defined in claim 1 wherein the major portion of said cam means is V-shaped and has its legs converging longitudinally inward to a point adjacent said pockets of said grooves.

3. An apparatus as defined in claim 2 wherein said cam means comprises a continuous slot in said casing means.

4. An apparatus as defined in claim 3 wherein the relatively wide pocket of each groove has its bottom spaced from said casing means a greater distance than the bottom of each channel to accommodate the larger diameter of the edible article.

5. An apparatus as defined in claim 4 comprising roller means rotatably mounted on said casing means between its inlet and outlet openings in overlying relation to said groove pockets for engagement by the edible articles during penetration of the latter by the sticks, the rotatable mounting of the roller means permitting rotation thereof relative to the edible articles upon rotation of said drum and revolving of the articles with the said drum during the aforesaid penetration.

6. An apparatus as defined in claim 1 wherein said cam means comprises a continuous slot in said casing means.

7. An apparatus as defined in claim 6 comprising roller means rotatably mounted on said casing means between its inlet and outlet openings in overlying relation to said groove pockets for engagement by the edible articles during penetration of the latter by sticks, the rotatable mounting of the roller means permitting rotation thereof relative to the edible articles upon rotation of said drum and revolving of the articles with the said drum during the aforesaid penetration.

8. An apparatus as defined in claim 1 wherein the relatively wide pocket of each groove has its bottom spaced from said casing means a greater distance than the bottom of each channel to accommodate the larger diameter of the edible article.

9. An apparatus as defined in claim 1 comprising roller means rotatably mounted on said casing means between its inlet and outlet openings in overlying relation to said groove pockets for engagement by the edible articles penetration of the latter by the sticks, the rotatable mounting of the roller means permitting rotation thereof relative to the edible articles upon rotation of said drum and revolving of the articles with the said drum during the aforesaid penetration.

10. An apparatus as defined in claim 9 wherein the major portion of said cam means is V-shaped and has its legs converging longitudinally inward to a point adjacent said pockets of said grooves.

* * * * *